Figure 1:
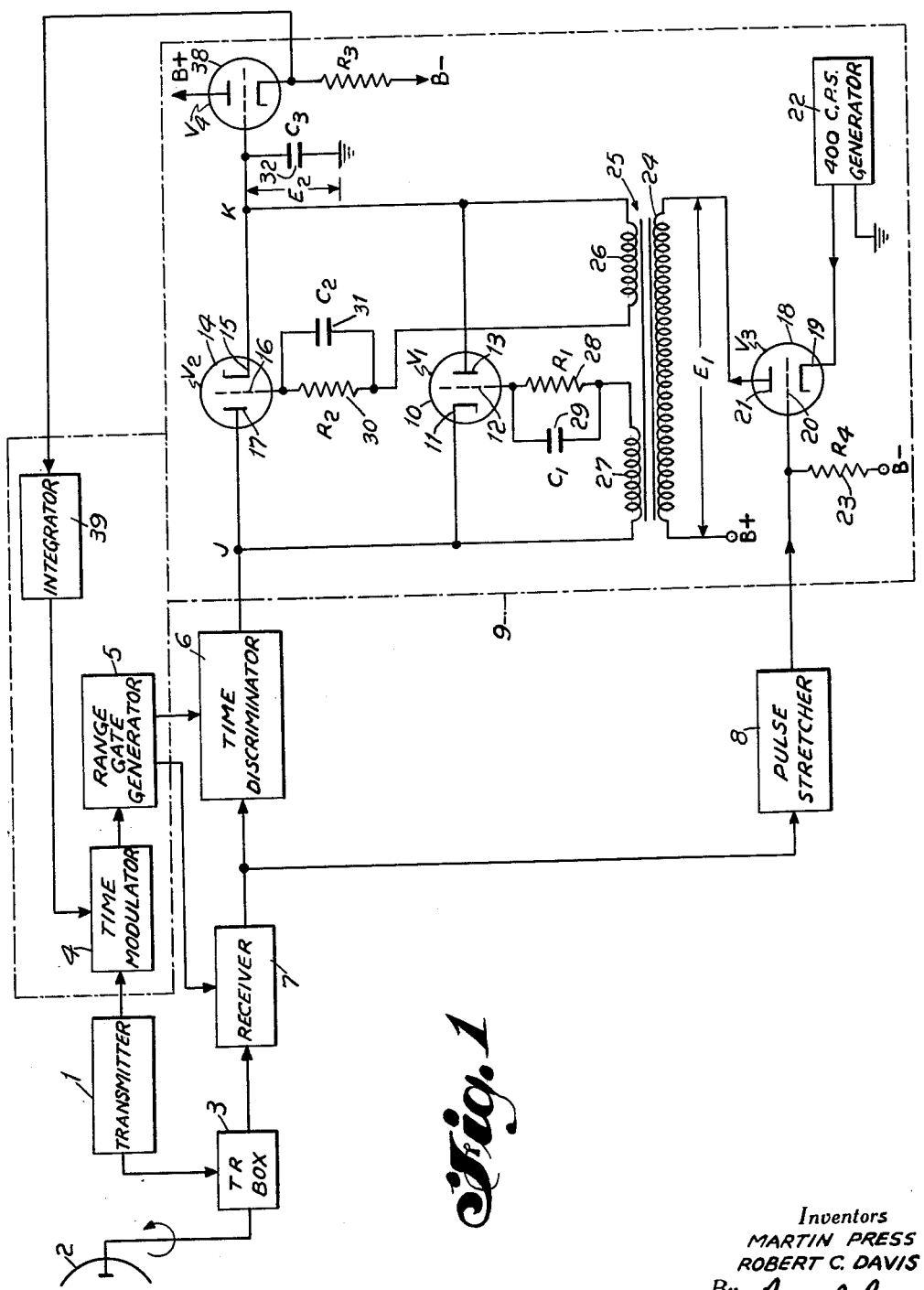

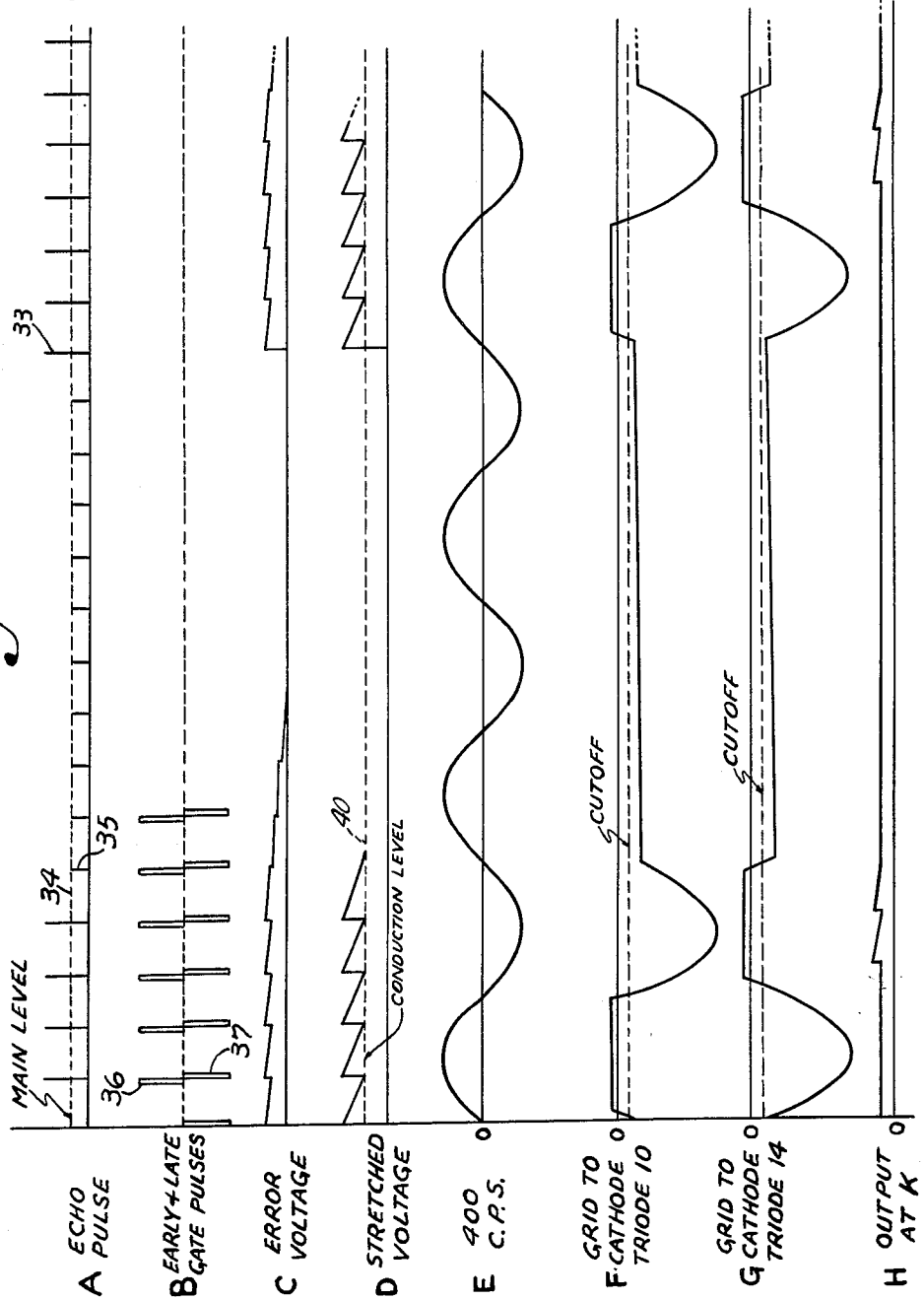

3,054,102
RADAR TRACKING SYSTEM
Martin Press, Englewood, and Robert C. Davis, Cedar Grove, N.J., assignors to International Telephone and Telegraph Corporation, Nutley, N.J., a corporation of Maryland
Filed May 14, 1958, Ser. No. 736,443
9 Claims. (Cl. 343—7.3)

This invention relates to radar tracking systems and more particularly to a D.C., bipolar switching circuit.

In radar automatic range tracking units echo signals from a target are lost when the scanning antenna encounters in front of it an obstacle which blocks off the transmission of the radar pulse from the target which has been detected. Echo signals may also be lost due to noise generated in the system or picked up by the antenna or due to wave cancellation. Radar systems employ double integrators to insure both position and velocity memory in such cases when the echo signal is lost. Perfect velocity memory insures coincidence of the echo and the range gate of the radar system in the event of a signal fading if the target-to-radar velocity is constant and the spurious output from the time discriminator is zero. However, conventional boot-strap or Miller integrators do not act as perfect integrators and conventional time discriminators do not have zero spurious output. For this reason to increase the velocity memory in range tracking units, disconnectors are employed in the circuit in order to disconnect the time discriminator circuit when the error signal lies below a threshold value as it should with only noise present or when located accurately on a signal. Neon-tubes, biased back-to-back diodes and mechanical switching have been used in this application. The only circuit in which the insertion of a neon-tube is really appropriate is the difference integrator, for in other circuits the time discriminator must provide adequate voltage to overcome the neon-tube striking voltage. If the difference integrator circuit is not appropriate and yet the circuit demands a disconnector, a pair of back-to-back biased diodes can be used with the precaution that the leakage currents associated with the electrodes of the diodes be kept very much smaller than the unbalance currents of the discriminator. Another way of providing for disconnect is to have a mechanical switch in place of the neon-tubes and the diodes. However, a mechanical switch ordinarily does not have sufficient speed to accomplish this action.

It is therefore an object of this invention to provide an improved switching circuit to improve velocity memory in range tracking units.

Another object is to provide a switching circuit which is suitable for D.C. bipolar switching.

A further object is to provide a switching circuit for use in range tracking units which will effectively disconnect the time discriminator circuit, thus preventing the transfer of spurious signals, such as noise, and which switching circuit can act at the high speed required in radar tracking systems.

A feature of this invention is in a radar tracking system having a receiver, a range tracking circuit and a range gate generator producing range gate signals, the receiver being responsive to desired signals and capable of passing undesired signals. Discriminator means are provided to produce an error voltage responsive to the time difference between the desired signals and the range gate signals. Means are provided to derive only from the desired signals a control voltage. The output of the discriminator is fed into a switching circuit which has input and output means, conduction means coupling the input means to the output means, and means responsive to the control voltage to control the conduction of the conduction means whereby the conduction means is caused to conduct at the output means an output voltage corresponding to the error voltage during the application of the control voltage and to cause the conduction means to become non-conducting when the control voltage vanishes due to the disappearance of the desired signals.

Another feature is the provision of means to maintain the output voltage for a given time period after the desired signals have disappeared.

A further feature is that the conduction means comprises first and second electron discharge devices, each said electron discharge device having an anode, a cathode, and a control grid, and the input means couples the error voltage to the cathode of one electron discharge device and the anode of the other electron discharge device.

Still another feature is that the means to derive the control voltage comprises a pulse stretcher, and the output of the pulse stretcher is coupled to the control grid input of a third electron discharge device in the switching circuit.

Another feature is that a source of sinusoidal voltage is coupled to the cathode of the third electron discharge device and the passage of said sinusoidal voltage through the discharge device is controlled by the bias action of the control voltage.

A further feature is that the sinusoidal voltage is coupled to the control grids of the first and second electron discharge devices by transformer means and resistance and capacitance means whereby the voltage applied to the grid of the first electron discharge device is 180 degrees out of phase with the voltage applied to the grid of the second electron discharge device.

Still another feature is that a fourth electron discharge device is provided and the output of the first and second electron discharge devices is coupled to the grid of the fourth electron discharge device and a capacitor couples that grid to ground, thus providing a holding or integrating device for the output voltage of the two back-to-back coupled electron discharge devices.

Another feature of this invention is a switching circuit comprising a source of desired signals, a source of reference signals, means to produce an error voltage responsive to the difference between the desired signals and the reference signals, means to derive from the desired signals a control voltage, input means, output means, conduction means coupling the input means to the output means, means to control the conduction of the conduction means, and means to apply the error voltage to the input means. There are provided means to apply the control voltage to the control means to cause the conduction means to conduct to the output means, an output voltage corresponding to the error voltage during the application of the control voltage and to cause the conduction means to become non-conducting when the control voltage vanishes due to the disappearance of the desired signals.

The above-mentioned and other features and objects of this invention will become more apparent by reference to the following description taken in conjunction with the accompanying drawings, in which:

FIG. 1 is a block diagram and schematic of the switching circuit of this invention incorporated in the range tracking circuit of a radar system; and FIG. 2 is a graph of the waveforms used in the description of the operation of this circuit.

With reference to FIGS. 1 and 2, there is shown a radar transmitter 1 which delivers a radar pulse, commonly referred to as the "main bang," to an antenna 2 via a TR box 3. The "main bang" pulse is also fed to the time modulator 4. The output of the time modulator 4 triggers a range gate generator 5 which delivers an early and late gate pulse which is fed to a time discriminator 6. The range gate generator 5 also delivers a gate pulse to the receiver 7 which gates the echo pulse. An echo pulse of the character shown as waveform A of FIG. 2 is received by the antenna 2 from a target and is transmitted via the TR box 3 to a receiver 7. The output of the receiver 7 is fed to the time discriminator 6 where it is compared with the early and late gate pulse output of the range gate generator 5 of the character shown in waveform B of FIG. 2, and an error voltage output, waveform C, of the time discriminator results. The same output of the receiver is fed into a pulse stretcher 8 in order to produce as the output thereof the voltage D which is a positive voltage having a saw-tooth waveform as determined by the characteristics of the pulse stretcher 8. The switching circuit 9 includes a first vacuum tube 10 having a cathode 11, a control grid 12, and an anode 13. A second vacuum tube 14 has a cathode 15, a control grid 16, and a plate 17. A control tube 18 has a cathode 19, a grid 20, and a plate 21. The triodes 10 and 14 are connected back to back with the cathode 11 coupled to plate 17, and the output error voltage C of the time discriminator is coupled thereto. The output of the pulse stretcher, the stretched voltage D, is fed to the grid 20 of triode 18. A sinusoidal voltage generator 22, which preferably generates a signal of 400 c.p.s., is coupled to the cathode 19. The grid 20 is also coupled to a source of negative voltage by the resistor 23. When the positive stretched output D of the pulse stretcher 8 is above the conduction level 40, it is sufficient to overcome the negative bias imposed upon the grid 20 and the triode 18 conducts, the output thereof being the amplified sinusoidal voltage output of the generator 22. The plate 21 is coupled to the primary winding 24 of a transformer 25 which has first and secondary windings 26 and 27 inductively coupled to the primary winding 24, the output of each of said windings 26 and 27 being 180 degrees out of phase with the other. The output of winding 27 is coupled to the grid 12 via a resistor 28 which is bypassed by capacitor 29. The output of winding 26 is coupled to grid 16 by means of resistor 30 which is bypassed by capacitor 31.

The output of generator 22 is the sinusoidal waveform E. When the negative half cycle of the voltage E occurs, triode 14 conducts when the bias on the grid 16 exceeds the cutoff voltage with respect to cathode 15 by virtue of the output of winding 26 which is 180° out of phase with the primary voltage $E_1$ and if J is positive with respect to K (as shown in C). Triode 10 is non-conducting because of the negative bias impressed upon the control grid 12 by virtue of the in-phase output of the secondary winding 27. The output voltage at K will be substantially a constant voltage because of the capacitor 32. It can be seen by reference to waveform A where the echo pulses 33 are shown much greater in amplitude than the noise level 34, that the output of the time discriminator, the voltage C, will be substantially constant at a comparatively high level during the time that the pulses are at the amplitude of pulse 33. When, however, the echo pulses have an amplitude below the noise level, such as shown by the pulses 35, then the error voltage output diminishes and will eventually vanish. The pulses 33 are positive pulses, and as shown, they will fall in the early portion 36 of the gate pulse B thereby creating a positive error voltage C. It will be understood that should the echo pulse 33 fall within the late area 37 of the gate pulse B, then a negative error voltage output of the discriminator 6 will result. However, since the echo pulse A is positive, the output of the pulse stretcher is positive, and as seen in waveform D, that output will also diminish to zero when the echo pulse 33 vanishes below the noise threshold level. At the point where the stretched voltage goes below the conduction line 40, which is representative of the cutoff level in triode 18, the conduction through the triode 18 will cease. The amplitude of the sinusoidal voltage $E_1$ controls the resistance between point J and point K. When $E_1$ is reduced to zero upon cutoff of triode 18, the resistance from J to K is essentially infinite for a time dependent upon the RC constant of $R_1C_1$ and $R_2C_2$, the amplitude of $E_1$, the characteristics of the triodes 10 and 14 and the voltage difference that exists between J and K. This time has been made five seconds in the reduction to practice of this invention and may be extended. In waveforms F and G is shown the conduction of triodes 10 and 14 during the time that the echo signal amplitude is above the noise level, below the noise level and when the echo signal recovers the amplitude 33 when the same action as described occurs. If the error signal C is positive, then triode 14 conducts the error signal; if the error signal is negative, then triode 10 will conduct the error signal; therefore, this switching circuit will transmitt a D.C. voltage of negative or positive polarity. The amplitude of $E_1$ as described heretofore is controlled by the D.C. voltage output of the pulse stretcher 8.

Since it is desired to hold the output voltage of the triodes 10 and 14 at a value determined by the input voltage when the signal voltage fades, a holding circuit comprising a capacitor 32 and a triode 38 is provided. When the input signal fades, $E_1$ goes to zero and the resistance from J to K becomes infinite. The capacitor 32 then holds the voltage $E_2$ within limits determined by the time constant of the capacitor 32 and the input resistance of the cathode follower triode 38 which can be made extremely high. When the input voltage $E_1$ vanishes, capacitors 29 and 31 retain charges thereon which negatively bias the grids 12 and 16 beyond cutoff, preventing any conduction through the triodes 10 and 14 of spurious signals until such time as the charges discharge through the resistors $R_1$ and $R_2$. This time of course can be made substantially as long as necessary determined by the exigencies of the radar system in which it is to be used. This switching circuit can be used as a single integrator by virtue of the action of the capacitor 32 and the resistance of triode 38. The output of the triode 38 is then coupled into the integrator 39 of a range memory circuit whose output comprises the time information, or in other words, the output of the integrator is proportional to the range of the selected target at any instant of time and includes as its input the information of rate of change of range comprising the output of the holding circuit of the triode 38 and capacitor 32. The output of the integrator 39 is then applied to the time modulator to vary the time delay in the modulator and thus make the entire radar system track the target. Let it be assumed that due to noise fading or other causes the selected target echo pulse is lost in noise. Due to the velocity memory incorporated in the circuit of triode 38 and capacitor 32, the radar system continues to track the echo pulse at the same velocity as the rate of change of the target just prior to the loss of the echo pulse. When the echo pulse is regained, then the operation proceeds as before. This circuit acts as a low-pass filter which has a time constant RC, where R is approximately twice the resistance of triode 10 or 14 plus the output resistance of the time discriminator 6 and C is the capacitance of capacitor 32, while $E_1$ is present, and becomes an integrator holding the last value of $E_2$ that was present before $E_1$ vanished. This circuit is particularly useful where high switching speeds of one millisecond or less are desired and in applications where the device is subjected to range acceleration and vibration.

In a reduction to practice of this invention, when the holding time was made 4.5 seconds, the following values for the circuit parameters were used:

$C_1, C_2$, 1.5 μf. capacitor
$C_3$, 0.2 μf. capacitor
$R_1, R_2$, 1 megohm
$R_4$, 100,000 ohms
$V_1$, ½ tube type 6BF7
$V_2$, ½ tube type 6BF7
$V_3$, ½ tube type 6BF7
$V_4$, ½ tube type 6BF7

B—, supply, —15 v.
B+ supply, +150 v.
$E_1$, 15 volts R.M.S.
$E_2$, 10 volts
(Resistance from J to K 75,000 ohms) (while $E_1$ present)

While we have described above the principles of our invention in connection with specific apparatus, it is to be clearly understood that this description is made only by way of example and not as a limitation to the scope of our invention as set forth in the objects thereof and in the accompanying claims.

We claim:

1. In a radar tracking system having a receiver, a range tracking circuit and a range gate generator producing range gate signals, said receiver being responsive to desired echo signals and capable of passing undesired signals; means to produce an error voltage responsive to the time difference between said desired signals and said range gate signals, means to derive only from said desired signals a control voltage, a switching circuit comprising input and output means, conduction means coupling said input means to said output means, means to control the conduction of said conduction means, means to apply said error voltage to said input means, means to apply said control voltage to said control means to cause said conduction means to conduct at said output means an output voltage corresponding to said error voltage during the application of said control voltage and to cause said conduction means to become nonconducting when said control voltage vanishes due to the disappearance of said desired signals, means applying said output voltage to said range tracking circuit, and means to maintain said output voltage for a given time period after said desired signals disappeared.

2. In a radar tracking system as in claim 1 wherein said conduction means comprise first and second electron discharge devices, each said electron discharge device having at least an anode, a cathode and a control grid, and said input means couples said error voltage to the cathode of said first electron discharge device and the anode of said second electron discharge device.

3. In a radar tracking system as in claim 2 wherein said means to derive a control voltage comprise a pulse stretcher and means coupling said desired signals to the input of said pulse stretcher.

4. In a radar tracking system as in claim 3 wherein said control means comprise a source of sinusoidal voltage, means coupling said sinusoidal voltage to said control grids of said first and second electron discharge device to control the conduction therethrough of said error voltage, and means responsive to said control voltage to control the transmission of said sinusoidal voltage to said control grids of said first and second electron discharge devices.

5. In a radar tracking system as in claim 4 wherein said control means further comprise a third electron discharge device having at least an anode, a cathode and a control grid responsive to said control voltage and said sinusoidal voltage, transformer means having a primary winding and first and second secondary windings inductively coupled to said primary winding, the output of said first secondary winding being opposite in phase to the output of said second secondary winding, means coupling said anode of said third electron discharge device to said primary winding, a first resistor coupling the output of said first secondary winding to said control grid of said first electron discharge device, a first capacitor by-passing said first resistor, a second resistor coupling the output of said second secondary winding to said control grid of said second electron discharge device, a second capacitor by-passing said second resistor, whereby said first and second electron discharge devices are caused to conduct and to produce said output voltage therefrom when the grid voltage of said first and second electron discharge devices exceeds cut-off.

6. In a radar tracking system as in claim 5 wherein said means to maintain said output voltage comprises a fourth electron discharge device responsive to said output voltage and having at least an anode, a cathode, and a control grid, and a third capacitor coupling said control grid to ground.

7. A switching circuit comprising a source of desired signals, a source of reference signals, means to produce an error voltage responsive to the difference between said desired signals and said reference signals, means to derive from said desired signals a control voltage, input means, output means, conduction means coupling said input means to said output means, means to control the conduction of said conduction means, means to apply said error voltage to said input means, means to apply said control voltage to said control means to cause said conduction means to conduct at said output means an output voltage corresponding to said error voltage during the application of said control voltage and to cause said conduction means to become non-conducting when said control voltage vanishes due to the disappearance of said desired signals, said conduction means comprising first and second electron discharge devices, each said electron discharge device having at least an anode, a cathode and a control grid, and said input means couples said error voltage to the cathode of said first electron discharge device and the anode of said second electron discharge device.

8. A switching circuit according to claim 7 wherein said control means comprise a source of sinusoidal voltage, and means responsive to said control voltage to control the transmission of said sinusoidal voltage to said control grids of said first and second electron discharge devices and thereby control the conduction therethrough of said error voltage.

9. A switching circuit according to claim 8 wherein said control means further comprise a third electron discharge device responsive to said control voltage and said sinusoidal voltage and having at least an anode, a cathode and a control grid, transformer means having a primary winding and first and second secondary windings inductively coupled to said primary winding, the output of said first secondary winding being opposite in phase to the output of said second secondary winding, means coupling said anode of said third electron discharge device to said primary winding, a first resistor coupling the output of said first secondary winding to said control grid of said first electron discharge device, a first capacitor by-passing said first resistor, a second resistor coupling the output of said second secondary winding to said control grid of said second electron discharge device, a second capacitor by-passing said second resistor, whereby said first and second electron discharge devices are caused to conduct and to produce said output voltage therefrom when the grid voltage of said first and second electron discharge devices exceeds cut-off.

References Cited in the file of this patent

UNITED STATES PATENTS

| | | |
|---|---|---|
| 2,776,424 | Lair | Jan. 1, 1957 |
| 2,860,330 | Giles | Nov. 11, 1958 |